United States Patent
Zhou et al.

(10) Patent No.: US 10,891,161 B2
(45) Date of Patent: *Jan. 12, 2021

(54) METHOD AND DEVICE FOR VIRTUAL RESOURCE ALLOCATION, MODELING, AND DATA PREDICTION

(71) Applicant: Advanced New Technologies Co., Ltd., Grand Cayman (KY)

(72) Inventors: Jun Zhou, Hangzhou (CN); Xiaolong Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,637

(22) Filed: Jun. 22, 2020

(65) Prior Publication Data

US 2020/0319927 A1 Oct. 8, 2020

Related U.S. Application Data

(63) Continuation of application No. 16/697,913, filed on Nov. 27, 2019, now Pat. No. 10,691,494, which is a (Continued)

(30) Foreign Application Priority Data

Sep. 27, 2017 (CN) .......................... 2017 1 0890033

(51) Int. Cl.
G06F 9/50 (2006.01)
G06F 17/16 (2006.01)
G06N 20/00 (2019.01)

(52) U.S. Cl.
CPC ............ *G06F 9/5011* (2013.01); *G06F 17/16* (2013.01); *G06N 20/00* (2019.01)

(58) Field of Classification Search
CPC ........ G06F 9/5011; G06F 17/16; G06N 20/00
See application file for complete search history.

(56) References Cited

U.S. PATENT DOCUMENTS 6,963,826 B2   11/2005  Hanaman et al.
7,113,932 B2   9/2006   Tayebnejad et al.
(Continued)

FOREIGN PATENT DOCUMENTS

CN    103051645    4/2013
CN    104240016    12/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ranodhi Serrao
(74) *Attorney, Agent, or Firm* — Fish & Richardson P.C.

(57) ABSTRACT

Evaluation results of a plurality of users are received from a plurality of data providers. The evaluation results are obtained by the plurality of data providers evaluating the plurality of users based on evaluation models of the plurality of data providers. A plurality of training samples is constructed by using the evaluation results. Each training sample includes a respective subset of the evaluation results corresponding to a same user of the plurality of users. A label for each training sample is generated based on an actual service execution status of the same user. A model is trained based on the plurality of training samples and the plurality of labels, including setting a plurality of variable coefficients, each variable coefficient specifying a contribution (Continued)

level of a corresponding data provider. Virtual resources to each data provider are allocated based on the plurality of variable coefficients.

24 Claims, 6 Drawing Sheets

Related U.S. Application Data continuation of application No. PCT/CN2018/107261, filed on Sep. 25, 2018.

(56) References Cited

U.S. PATENT DOCUMENTS

| | | |
|---|---|---|
| 7,444,308 B2 | 10/2008 | Guyon et al. |
| 8,417,715 B1 | 4/2013 | Bruckhaus et al. |
| 8,630,902 B2 | 1/2014 | Baum et al. |
| 8,655,695 B1 | 2/2014 | Qu et al. |
| 8,762,299 B1 | 6/2014 | Breckenridge et al. |
| 9,239,996 B2 | 1/2016 | Moorthi et al. |
| 9,342,798 B2 | 5/2016 | Breckenridge et al. |
| 9,436,911 B2 | 9/2016 | Spagnola |
| 9,495,641 B2 | 11/2016 | Schmidt |
| 9,672,474 B2 | 6/2017 | Dirac et al. |
| 10,691,494 B2 | 6/2020 | Zhou et al. |
| 2015/0281320 A1 | 10/2015 | Yuan et al. |
| 2017/0148027 A1 | 5/2017 | Yu et al. |
| 2020/0097329 A1 | 3/2020 | Zhou et al. |

FOREIGN PATENT DOCUMENTS

| | | |
|---|---|---|
| CN | 104866969 | 8/2015 |
| CN | 105225149 | 1/2016 |
| CN | 105556552 | 5/2016 |
| CN | 106204033 | 7/2016 |
| CN | 106127363 | 11/2016 |
| CN | 106897918 | 6/2017 |
| EP | 2490139 | 8/2012 |
| WO | WO 2014160296 | 10/2014 |
| WO | WO 2017143919 | 8/2017 |

OTHER PUBLICATIONS

Extended European Search Report in European Application No. 18861936.5, dated Mar. 27, 2020, 12 pages.
International Preliminary Report on Patentability in International Application No. PCT/CN2018/107261, dated Mar. 31, 2020, 8 pages (with English translation).
International Search Report and Written Opinion in International Application No. PCT/CN2018/107261, dated Jan. 4, 2019, 8 pages (with partial English Translation).
Nakamoto, "Bitcoin: A Peer-to-Peer Electronic Cash System," www.bitcoin.org, 2005, 9 pages.

METHOD AND DEVICE FOR VIRTUAL RESOURCE ALLOCATION, MODELING, AND DATA PREDICTION

CROSS-REFERENCE TO RELATED APPLICATIONS

This application is a continuation of U.S. patent application Ser. No. 16/697,913, filed on Nov. 27, 2019, which is a continuation of PCT Application No. PCT/CN2018/107261, filed on Sep. 25, 2018, which claims priority to Chinese Patent Application No. 201710890033.1, filed on Sep. 27, 2017, and each application is hereby incorporated by reference in its entirety.

TECHNICAL FIELD

The present specification relates to the field of computer applications, and in particular, to a method and an apparatus for virtual resource allocation, modeling, and data prediction.

BACKGROUND

With rapid development of Internet technologies, networking and transparency of personal data of users has become an irresistible trend. Some service platforms that provide Internet services for users can collect massive user data by collecting daily generated service data of the users. The user data is a very precious "resource" for an operator of the service platform. The operator of the service platform can construct a user evaluation model based on the "resource" through data mining and machine learning, and make evaluation and decision for the user by using the user evaluation model.

For example, in a credit-based loan granting scenario, data features of several dimensions can be extracted from massive user data, training samples can be constructed based on the extracted features, and a user risk evaluation model can be constructed through training by using a specific machine learning algorithm. Then, risk evaluation is performed on a user by using the user risk evaluation model, whether the user is a risky user is determined based on a risk evaluation result, and then whether a loan needs to be granted to the user is determined.

SUMMARY

The present specification provides a virtual resource allocation method, including: receiving evaluation results of several users that are uploaded by a plurality of data providers, where the evaluation results are obtained after the plurality of data providers evaluate the users respectively based on evaluation model of the plurality of data providers; constructing several training samples by using the evaluation results uploaded by the plurality of data providers as training data, where each training sample includes evaluation results of the same user that are uploaded by the plurality of data providers, and the training sample is labeled based on an actual service execution status of the user; and training a model based on the several training samples and the label of each training sample, using a coefficient of each variable in the trained models as the contribution level of each data provider, and allocating virtual resources to each data provider based on the contribution level of each data provider.

Optionally, the trained model is a linear model.

Optionally, the number of virtual resources allocated to each data provider is directly proportional to the contribution level of each data provider.

Optionally, the method further includes: receiving evaluation results of a certain user that are uploaded by the plurality of data providers, and inputting the evaluation results to the trained model to obtain a final evaluation result of the user.

Optionally, the virtual resource is a user data usage fund distributed to each data provider.

Optionally, the evaluation model is a user risk evaluation model, the evaluation result is risk score, and the label indicates whether the user is a risky user.

The present specification further provides a virtual resource allocation apparatus, including: a receiving module, configured to receive evaluation results of several users that are uploaded by a plurality of data providers, where the evaluation results are obtained after the plurality of data providers evaluate the users respectively based on evaluation models of the plurality of data providers; a training module, configured to construct several training samples by using the evaluation results uploaded by the plurality of data providers as training data, where each training sample includes evaluation results of the same user that are uploaded by the plurality of data providers, and the training sample is labeled based on an actual service execution status of the user; and an allocation module, configured to train a model based on the several training samples and the label of each training sample, use a coefficient of each variable in the trained models as the contribution level of each data provider, and allocate virtual resources to each data provider based on the contribution level of each data provider.

Optionally, the trained model is a linear model.

Optionally, the number of virtual resources allocated to each data provider is directly proportional to the contribution level of each data provider.

Optionally, the apparatus further includes: an evaluation module, configured to receive evaluation results of a certain user that are uploaded by the plurality of data providers, and input the evaluation results to the trained model to obtain a final evaluation result of the user.

Optionally, the virtual resource is a user data usage fund distributed to each data provider.

Optionally, the evaluation model is a user risk evaluation model, the evaluation result is risk score, and the label indicates whether the user is a risky user.

Optionally, the present specification further provides a modeling method, including: receiving evaluation results of several users that are uploaded by a plurality of data providers, where the evaluation results are obtained after the plurality of data providers evaluate the users respectively based on evaluation models of the plurality of data providers; constructing several training samples by using the evaluation results uploaded by the plurality of data providers as training data, where each training sample includes evaluation results of the same user that are uploaded by the plurality of data providers, and the training sample is labeled based on an actual service execution status of the user; and training a model based on the several training samples and the label of each training sample, to obtain a trained model.

Optionally, the trained model is a linear model.

Optionally, the evaluation model is a user risk evaluation model, the evaluation result is risk score, and the label indicates whether the user is a risky user.

The present specification further provides a data prediction method, including: receiving evaluation results of several users that are uploaded by a plurality of data providers, where the evaluation results are obtained after the plurality of data providers evaluate the users respectively based on evaluation models of the plurality of data providers; constructing several training samples by using the evaluation results uploaded by the plurality of data providers as training data, where each training sample includes evaluation results of the same user that are uploaded by the plurality of data providers, and the training sample is labeled based on an actual service execution status of the user; training a model based on the several training samples and the label of each training sample, to obtain a trained model; and receiving evaluation results of a certain user that are uploaded by the plurality of data providers, and inputting the evaluation results to the trained model to obtain a final evaluation result of the user.

The present specification further provides a virtual resource allocation system, including: servers of a plurality of data providers, configured to upload evaluation results of several users to a server of a risk evaluator, where the evaluation results are obtained after the plurality of data providers evaluate the users respectively based on evaluation models of the plurality of data providers; and the server of the risk evaluator, configured to construct several training samples by using the evaluation results uploaded by the plurality of data providers as training data, where each training sample includes evaluation results of the same user that are uploaded by the plurality of data providers, and the training sample is labeled based on an actual service execution status of the user; and train a model based on the several training samples and the label of each training sample, use a coefficient of each variable in the trained models as the contribution level of each data provider, and allocate virtual resources to each data provider based on the contribution level of each data provider.

The present specification further provides an electronic device, including: a processor; and a memory, configured to store machine executable instructions, where by reading and executing the machine executable instructions that are stored in the memory and that correspond to control logic of virtual resource allocation, the processor is prompted to perform the following operations: receiving evaluation results of several users that are uploaded by a plurality of data providers, where the evaluation results are obtained after the plurality of data providers evaluate the users respectively based on evaluation models of the plurality of data providers; constructing several training samples by using the evaluation results uploaded by the plurality of data providers as training data, where each training sample includes evaluation results of the same user that are uploaded by the plurality of data providers, and the training sample is labeled based on an actual service execution status of the user; and training a model based on the several training samples and the label of each training sample, using a coefficient of each variable in the trained models as the contribution level of each data provider, and allocating virtual resources to each data provider based on the contribution level of each data provider.

In the present specification, the plurality of data providers can upload, to the risk evaluator, evaluation results obtained after several users are separately evaluated based on evaluation models of the plurality of data providers, and the risk evaluator can construct several training samples by using the evaluation results uploaded by the plurality of data providers as training data, train a model, use a coefficient of each variable in the trained models as the contribution level of each data provider to the model, and then allocate virtual resources to each data provider based on the contribution level of each data provider.

On one hand, when the risk evaluator trains the model based on user data maintained by each data provider, the data provider needs to transmit, to the risk evaluator, only the evaluation results obtained through preliminary evaluations of several users by the data provider. Therefore, the data provider no longer needs to transmit the locally maintained raw user data to the risk evaluator, thereby significantly reducing the user privacy disclosure risk.

On the other hand, the coefficient of each variable in the trained models can truly reflect the contribution level of each data provider to the trained model. Therefore, the virtual resource is allocated to each data provider based on the contribution level, so that virtual resources can be properly allocated.

DESCRIPTION OF IMPLEMENTATIONS

Figure 1:
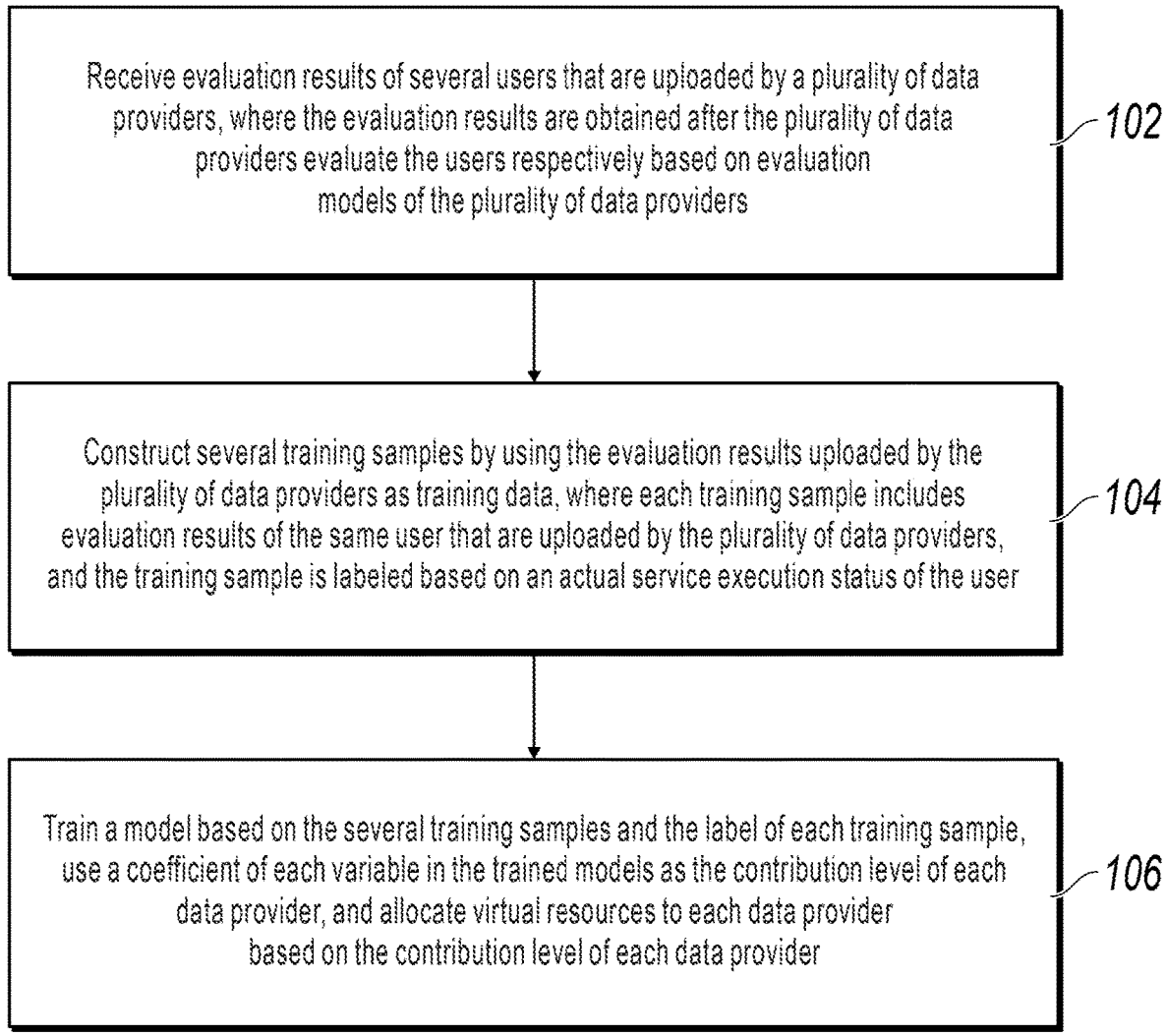
FIG. 1 is a flowchart illustrating a virtual resource allocation method, according to an implementation of the present specification.

In the big data era, various types of useful information can be obtained by mining massive data. Therefore, data is very important. Different institutions have their own data, but a data mining effect of any institution is subject to a data amount and a data type of the institution. A direct solution to this problem is as follows: A plurality of institutions cooperate with each other to share data, to achieve a better data mining effect, thereby achieving win-win.

However, for a data owner, data is an asset of great value, and for purposes such as privacy protection, the data owner is usually unwilling to provide data. In this case, it is difficult to actually perform "data sharing". Therefore, achieving data sharing while ensuring data security has become a top concern in the industry.

The present specification intends to provide a technical solution in which when a risk evaluator needs to train a model by "sharing" user data maintained by a plurality of data providers, "data sharing" can be achieved while each data provider no longer needs to transmit raw user data to the risk evaluator.

In implementation, each data provider can train, based on a machine learning algorithm, the user data locally maintained by the data provider, construct a user evaluation model, evaluate several sample users by using the user evaluation model, and then upload evaluation results to the risk evaluator.

The risk evaluator can construct several training samples by using the evaluation results uploaded by the plurality of data providers as training data. Each training sample includes evaluation results of the same user that are uploaded by the plurality of data providers. For example, a feature vector can be constructed by separately using evaluation results of a certain user that are uploaded by the plurality of data providers as modeling features, and the feature vector is used as a training sample.

In addition, the constructed training sample can be correspondingly labeled based on an actual service execution of the user. For example, in a credit-based loan granting service scenario, a label that each training sample is marked with can be a user label that is based on an actual repayment status of the user and that can indicate whether the user is a risky user.

Finally, the risk evaluator can train a model based on the constructed training samples and the label of each training sample, use a coefficient of each variable in the trained models as the contribution level of each data provider to the model, and then allocate virtual resources to each data provider based on the contribution level of each data provider.

On one hand, when the risk evaluator trains the model based on the user data maintained by each data provider, the data provider needs to transmit, to the risk evaluator, only the evaluation results obtained through preliminary evaluations of several users by the data provider. Therefore, the data provider no longer needs to transmit the locally maintained raw user data to the risk evaluator, thereby significantly reducing the user privacy disclosure risk.

On the other hand, the coefficient of each variable in the trained models can truly reflect the contribution level of each data provider to the trained model. Therefore, the virtual resource is allocated to each data provider based on the contribution level, so that virtual resources can be properly allocated.

A credit-based loan granting service scenario is used as an example. In this case, the user evaluation model can be a user risk evaluation model used to determine whether a user is a risky user, and the evaluation result can be risk score output after risk evaluation is performed on a user by using the user risk evaluation model.

In this scenario, each data provider can construct a user risk evaluation model based on user data maintained by the data provider. When needing to train a user risk evaluation model by sharing the user data of each data provider, the risk evaluator (for example, which can be a party that grants a loan) can construct several training samples by using evaluation results uploaded by the plurality of data providers as training data, mark, based on an actual repayment status of a user, each training sample with a label that can indicate whether the user is a risky user, then train the model based on the constructed training samples and the label of each training sample, use a coefficient of each variable in the trained models as the contribution level of each data provider to the model, and allocate virtual resources to each data provider based on the contribution level of each data provider. Therefore, in the whole process, "data sharing" can be achieved while each data provider does not need to provide the raw user data for the risk evaluator.

Detailed description is provided below by using specific implementations with reference to specific application scenarios.

FIG. 1 illustrates a virtual resource allocation method, according to an implementation of the present specification. The method is applied to a server of a risk evaluator, and the server performs the following steps.

Step 102: Receive evaluation results of several users that are uploaded by a plurality of data providers, where the evaluation results are obtained after the plurality of data providers evaluate the users respectively based on evaluation model of the plurality of data providers.

Step 104: Construct several training samples by using the evaluation results uploaded by the plurality of data providers as training data, where each training sample includes evaluation results of the same user that are uploaded by the plurality of data providers, and the training sample is labeled based on an actual service execution status of the user.

Step 106: Train a model based on the several training samples and the label of each training sample, use a coefficient of each variable in the trained models as the contribution level of each data provider, and allocate virtual resources to each data provider based on the contribution level of each data provider.

The data provider can include a party that has a cooperation relationship with the risk evaluator. In practice, the data provider and the risk evaluator can correspond to different operators. For example, the risk evaluator can be a data operation platform of company A, and the data provider can be a service platform, such as an e-commerce platform, a third-party bank, an express company, another financial institution, or a telecommunications operator, that cooperates with the data operation platform of company A.

The user evaluation model can include any type of machine learning model used to evaluate a user.

For example, in a shown implementation, the user evaluation model can be a user risk evaluation model (for example, a linear logistic regression model or a credit scoring model used to perform risk evaluation on a user) trained based on a specific machine learning algorithm. Correspondingly, the evaluation result output after the user is evaluated by using the user evaluation model can be risk score that represents a risk level of the user. In practice, the risk score is usually a floating-point value ranging from 0 to 1 (for example, the risk score can be a probability value that represents a risk level of a user). Alternatively, the evaluation result can be another form of score other than the risk score, for example, a credit score.

In the present specification, to reduce the user privacy disclosure risk caused by transmitting raw user data to the risk evaluator for modeling, each data provider can no longer need to transmit locally maintained raw user data to the risk evaluator, but perform modeling by using the locally maintained raw user data.

In implementation, a server of each data provider can collect daily generated user data at a back end, collect several pieces of user data from the collected user data as data samples, and generate an initialized data sample set based on the collected data samples.

The number of collected data samples is not limited in the present specification, and can be set by a person skilled in the art based on an actual demand.

A specific form of the user data depends on a specific service scenario and a modeling demand, can include any type of user data that can be used to extract modeling features to train a user evaluation model, and is not limited in the present specification.

For example, in practice, if it is desired to construct a credit scoring model used to perform risk evaluation on a user-initiated loan application or a payment transaction, the user data can include user data, such as transaction data, a shopping record, a repayment record, a consumption record, and a financial product purchase record of a user, that can be used to extract modeling features to train the risk evaluation model.

After generating the data sample set based on the collected data samples, the server of the data provider can further preprocess the data sample in the data sample set.

Preprocessing the data sample in the data sample set usually includes performing data cleaning, default value addition, normalization processing, or other forms of preprocessing processes on the data sample in the data sample set. The data sample in the data sample set is preprocessed, so that the collected data sample can be converted into a standardized data sample suitable for model training.

After preprocessing the data sample in the data sample set, the server of the data provider can extract data features (namely, modeling features that finally participate in modeling) of several dimensions from each of the data samples in the data sample set. The number of extracted data features of several dimensions is not limited in the present specification, and can be selected by a person skilled in the art based on an actual modeling demand.

In addition, a specific type of the extracted data feature is not limited in the present specification. A person skilled in the art can manually select, based on an actual modeling demand, the data feature from information actually included in the data sample.

After extracting the data features of the several dimensions from each of the data samples, the server of the data provider can generate one data feature vector for each data sample based on data feature values corresponding to the extracted data features of the dimensions, and then construct a target matrix based on the data feature vector of each data sample. In an example in which data features of M dimensions are extracted from each of N data samples, the target matrix can be a matrix of a dimension of N×M.

In this case, the constructed target matrix is a final training sample set for model training. The server of each data provider can perform machine learning based on a specific machine learning algorithm by using the target matrix as an original sample training set, to train a user evaluation model.

It is worthwhile to note that machine learning algorithms used by the plurality of data providers to train the user evaluation models can be the same or different, and are not limited in the present specification.

In the present specification, the machine learning model can be a supervised machine learning model. For example, the machine learning model can be a logistic regression (LR) model.

In this case, each data sample in the training sample set can include a pre-marked sample label. A specific form of the sample label usually also depends on a specific service scenario and a modeling demand, and is not limited in the present specification either.

For example, in practice, if it is desired to construct a model used to determine whether a loan can be granted to a user, the sample label can be a user label used to indicate whether the user is a risky user. The user label can be marked and provided by the risk evaluator. In this case, each data feature vector in the target matrix can correspond to one sample label.

A specific process in which each data provider trains the user evaluation model based on the supervised machine learning algorithm is not described in detail in the present specification. When a person skilled in the art implements the technical solution described in the present specification, references can be made to a record in a related technology.

For example, the supervised machine learning algorithm is an LR algorithm. When a logistic regression model is trained based on the LR algorithm, a fitting error between a training sample and a corresponding sample label usually can be evaluated by using a loss function. In implementation, the training sample and the corresponding sample label can be input to the loss function as input values, and repeated iterative calculation is performed by using a gradient descent method until convergence is reached. As such, a value of a model parameter (namely, an optimal weight value of each modeling feature in the training sample, where the weight value can represent the contribution level of each modeling feature to a model output result) can be obtained, and then the logistic regression model can be constructed by using the obtained value of the model parameter as an optimal parameter.

Figure 2:
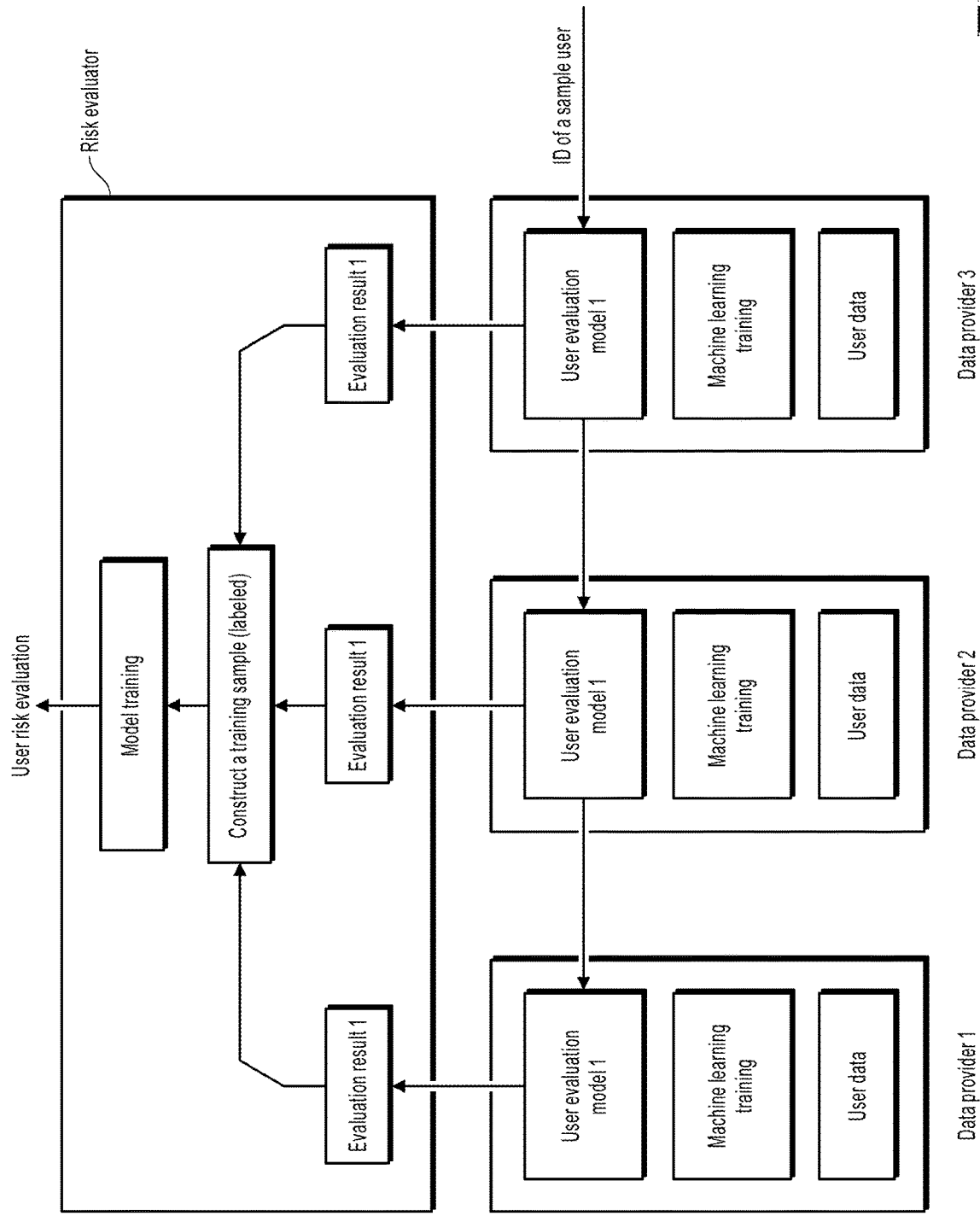
FIG. 2 is a schematic diagram illustrating training a model by a risk evaluator based on evaluation results uploaded by a plurality of data providers, according to an implementation of the present specification.

FIG. 2 is a schematic diagram illustrating training a model by a risk evaluator based on evaluation results uploaded by a plurality of data providers, according to an implementation of the present specification.

In an initial state, the risk evaluator can prepare several sample users, and notify each data provider of user IDs of the sample users. For example, in implementation, the user IDs of the sample users can be sent to each data provider in a form of a list.

After receiving the user IDs of the several sample users, each data provider can separately evaluate the sample users by using a user evaluation model of the data provider, and then upload evaluation results to the risk evaluator, and the risk evaluator performs modeling.

Certainly, in the evaluation results sent by the plurality of data providers to the risk evaluator, if the same user has the same ID, the risk evaluator does not need to notify each data provider of the user IDs of the sample users.

It can be seen that in this method, each data provider no longer needs to "share" locally maintained raw user data with the risk evaluator, and needs to "share" only a preliminary evaluation result of a user with the risk evaluator.

On one hand, the preliminary evaluation result that the data provider "shares" with the risk evaluator can be understood as a result obtained by decreasing a dimension of the locally maintained user data. To be specific, the preliminary evaluation result that each data provider "shares" can be considered as a data feature obtained by decreasing the dimension of the locally maintained user data to dimension 1.

On the other hand, the preliminary evaluation result is obtained by each data provider through modeling by performing machine learning on the locally maintained user data. Therefore, "sharing" the preliminary evaluation result with the risk evaluator is equivalent to sharing, with the risk evaluator, data value obtained by learning and analyzing the locally maintained user data based on the machine learning. Although each data provider does not "share" the raw user data with the risk evaluator, data sharing can still be achieved by "sharing" the data value.

In the present specification, after receiving the evaluation results that correspond to the sample users and that are uploaded by the plurality of data providers, the risk evaluator can construct a corresponding training sample for each sample user by using the evaluation results uploaded by the plurality of data providers as training data.

In this case, each constructed training sample includes evaluation results obtained after the plurality of data providers preliminarily evaluate, based on the trained user evaluation models, a sample user corresponding to the training sample. An evaluation result from each data provider corresponds to one feature variable in the training sample.

The feature variable refers to a feature field that constitutes the training sample. In the present specification, each training sample includes several feature fields, and each feature field corresponds to an evaluation result uploaded by one data provider.

After the corresponding training sample is constructed for each sample user, a training sample set can be further generated based on the constructed training samples, and the training sample is correspondingly labeled based on an actual service execution status of each sample user. For example, in a credit-based loan granting service scenario, a label that each training sample is marked with can be a user label that is based on an actual repayment status of the user and that can indicate whether the user is a risky user. In this scenario, the risk evaluator can mark each sample user with the user label based on information about whether each sample user finally defaults on repayment. For example, assume that after a loan is finally granted to a certain sample user, the user defaults on repayment. In this case, in the training sample set, a training sample corresponding to the sample user is finally labeled to indicate that the user is a risky user.

After each of the training samples in the training sample set is labeled with the user label, a server of the risk evaluator can train a predetermined machine learning model based on the constructed training sample set and the label corresponding to each training sample.

In a shown implementation, there can be a certain linear relationship between evaluation results of the same user that are uploaded by the plurality of data providers and a user label (namely, a final user evaluation result) of the user.

For example, the risk evaluator can add up the evaluation results of the same user that are uploaded by the plurality of data providers after the evaluation results are multiplied by corresponding coefficients, and then use a calculation result as the final evaluation result of the user.

Therefore, in the present implementation, the machine learning model trained by the risk evaluator can be a linear model. For example, in practice, the machine learning model trained by the risk evaluator can be a linear logistic regression model.

The process in which the risk evaluator trains the linear model based on the constructed training sample set and the label corresponding to each training sample is a process in which the evaluation results uploaded by the plurality of data providers and the corresponding user labels are input to the linear model to perform linear fitting to obtain coefficients corresponding to respective variables, where the evaluation results are used as the independent variables, and the corresponding user labels are used as dependent variables. A specific implementation process is not described in detail in the present specification. When a person skilled in the art implements the technical solution in the present specification, references can be made to a record in a related technology.

In the present specification, after the risk evaluator obtains, through training by using the previous training process, the coefficients corresponding to the variables (namely, the evaluation results uploaded by the plurality of data providers) in the training samples, training of the model is completed.

After completing training of the model by using the preliminary evaluation results of the target users that are uploaded by the plurality of data providers, the risk evaluator can further allocate a certain quantity of virtual resources to each data provider based on the contribution level of each data provider to the trained model. The number of virtual resources allocated to each data provider can be directly proportional to a weight value (namely, a coefficient) of each data provider.

In a shown implementation, the virtual resource allocated to each data provider can be a user data usage fund distributed by the risk evaluator to each data provider. In this case, the risk evaluator can allocate, based on the contribution level of each data provider to the trained model, the user data usage fund that can be allocated to each data provider.

In a shown implementation, the contribution level of each data provider to the trained model can be represented by the coefficient that is obtained through training and that corresponds to each variable in the training sample. In this case, after obtaining, through training by using the previous model training process, the coefficient corresponding to each variable in the training sample, the risk evaluator can use the coefficient that is obtained through training and that corresponds to each variable as the contribution level of each data provider, and then allocate the fund to each data provider based on a value of the coefficient corresponding to each variable.

For example, the risk evaluator can use the coefficient of each variable as the contribution level to the model to obtain a corresponding allocation percentage through conversion, and then allocate a total amount of user data usage funds that can be allocated to the plurality of data providers to each data provider based on the allocation percentage obtained through conversion. In this case, a data provider with a high contribution level to the model can be allocated more data usage funds. In this method, a high-quality data provider can benefit more, so that each data provider can be encouraged to continuously improve quality of data maintained by the data provider.

Certainly, in practice, in the initial state, if the risk evaluator cannot collect enough training samples to complete training of the model, an initial coefficient can be set for each variable in the model, and the initial coefficient is used to represent an initial contribution level of each data provider to the model.

A policy for setting the initial contribution level is not limited in the present specification, and can be set based on an actual demand when a person skilled in the art implements the technical solution in the present specification.

For example, in an implementation, during cold start of the server of the risk evaluator (in other words, when the server of the risk evaluator starts for the first time), the same initial coefficient can be set for the variables in the model in a weighted averaging way, and virtual resources are equally allocated to the plurality of data providers by using the initial coefficient as initial contributions level of the plurality of data providers.

For example, the virtual resource allocated by the risk evaluator to each data provider is a user data usage fund distributed by the risk evaluator to each data provider. In this case, the risk evaluator can equally allocate the total amount of user data usage funds that can be allocated to the plurality of data providers to the plurality of data providers based on the initial contributions level of the plurality of data providers.

It can be seen that in this method, the coefficient of each variable in the trained models can truly reflect the contribution level of each data provider to the trained model. Therefore, the virtual resource is allocated to each data provider based on the contribution level, so that virtual resources can be properly allocated.

Referring back to FIG. 2, after completing training of the model, the risk evaluator can subsequently perform risk evaluation on a certain target user by using the trained model.

The target user can include a user whose risk evaluation needs to be performed by the risk evaluator. For example, in a credit-based loan granting service scenario, the risk evaluator can be a party that grants a loan, and the target user can be a user who initiates a loan application and for which the risk evaluator needs to perform risk evaluation and determines whether to grant a loan.

After receiving a user ID of the target user, the plurality of data providers can search, based on the user ID, for evaluation results obtained after evaluation is performed by using user evaluation models of the plurality of data providers, and then upload the evaluation results to the risk evaluator.

After receiving the evaluation results of the target user from the plurality of data providers, the risk evaluator can construct a corresponding prediction sample for the target user by using the evaluation results uploaded by the plurality of data providers as training data, input the prediction sample to the trained model for prediction calculation to obtain a final evaluation result of the user, and make a corresponding service decision based on the final evaluation result.

A credit-based loan granting service scenario is still used as an example. In this scenario, the final evaluation result can still be risk score. When determining, based on the risk score, whether to grant a loan to the user, the risk evaluator can compare the risk score with a predetermined risk threshold. If the risk score is greater than or equal to the risk threshold, it indicates that the target user is a risky user. In this case, the user can be labeled to indicate that the user is a risky user, and the loan application initiated by the user is terminated.

Alternatively, if the risk score is less than the risk threshold, it indicates that the target user is a low-risk user. In this case, the user can be labeled to indicate that the user is a low-risk user, the loan application initiated by the user is normally responded, and a loan is granted to the user.

Certainly, after a loan is granted to the target user, the user label that the user is marked with can be maintained and updated based on information about whether the target user finally defaults on repayment. For example, assume that the target user is not marked as a risky user, and after a loan is finally granted to the user, if the user defaults on repayment, the marked user label can be immediately updated, and the user is re-marked as a risky user.

Finally, it is worthwhile to note that in the present specification, the data provider that has a cooperation relationship with the risk evaluator can be dynamically changed.

A data modeling party can support any data provider in exiting "data sharing" at any time, and can further support any data provider in joining "data sharing" at any time. To be specific, the risk evaluator may not need to focus on a quantity and a type of data providers that have a cooperation relationship with the risk evaluator, and only needs to perform weighting calculation on preliminary evaluation results of the target user that are uploaded by data providers that currently maintain a cooperation relationship with the risk evaluator. It can be seen that in the present specification, the risk evaluator can flexibly cooperate with different types of data providers.

On one hand, it can be seen from the previous implementations that when the risk evaluator trains the model based on the user data maintained by each data provider, the data provider needs to transmit, to the risk evaluator, only the evaluation results obtained through preliminary evaluations of several users by the data provider. Therefore, the data provider no longer needs to transmit the locally maintained raw user data to the risk evaluator, thereby significantly reducing the user privacy disclosure risk.

On the other hand, the coefficient of each variable in the trained models can truly reflect the contribution level of each data provider to the trained model. Therefore, the virtual resource is allocated to each data provider based on the contribution level, so that virtual resources can be properly allocated.

Figure 3:
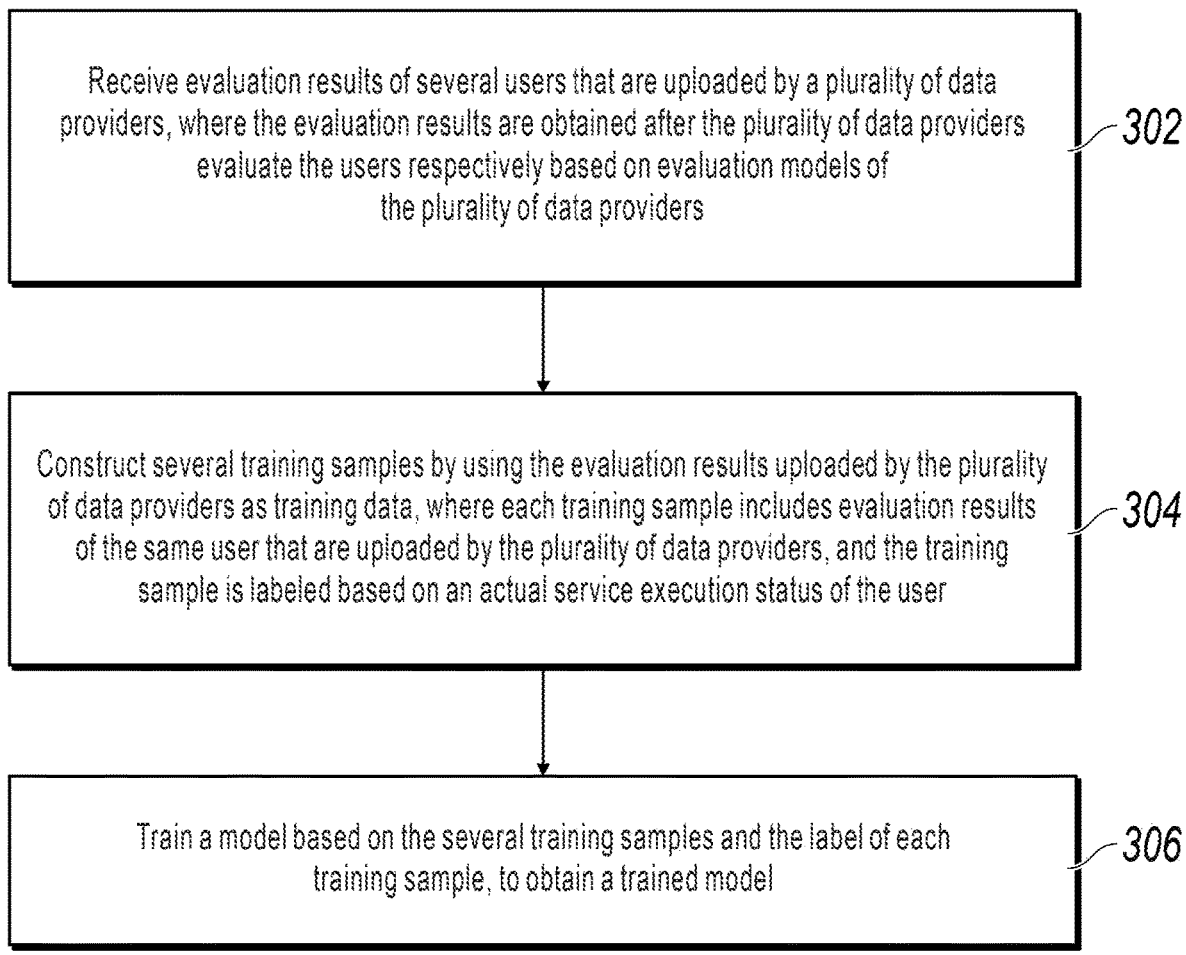
FIG. 3 is a flowchart illustrating a modeling method, according to an implementation of the present specification.

Referring to FIG. 3, corresponding to the method implementation, the present specification further provides a modeling method. The method is applied to a server of a risk evaluator, and the server performs the following steps:

Step 302: Receive evaluation results of several users that are uploaded by a plurality of data providers, where the evaluation results are obtained after the plurality of data providers evaluate the users respectively based on evaluation model of the plurality of data providers.

Step 304: Construct several training samples by using the evaluation results uploaded by the plurality of data providers as training data, where each training sample includes evaluation results of the same user that are uploaded by the plurality of data providers, and the training sample is labeled based on an actual service execution status of the user.

Step 306: Train a model based on the several training samples and the label of each training sample, to obtain a trained model.

In the present implementation, the trained model can be a linear model. For example, in practice, the trained model can be a linear logistic regression model. The evaluation model can be a user risk evaluation model, the evaluation result can be risk score (or credit score), and the label indicates whether the user is a risky user.

Implementation details of the steps are omitted in the present implementation, and a person skilled in the art can make references to the record in the previous implementation.

Figure 4:
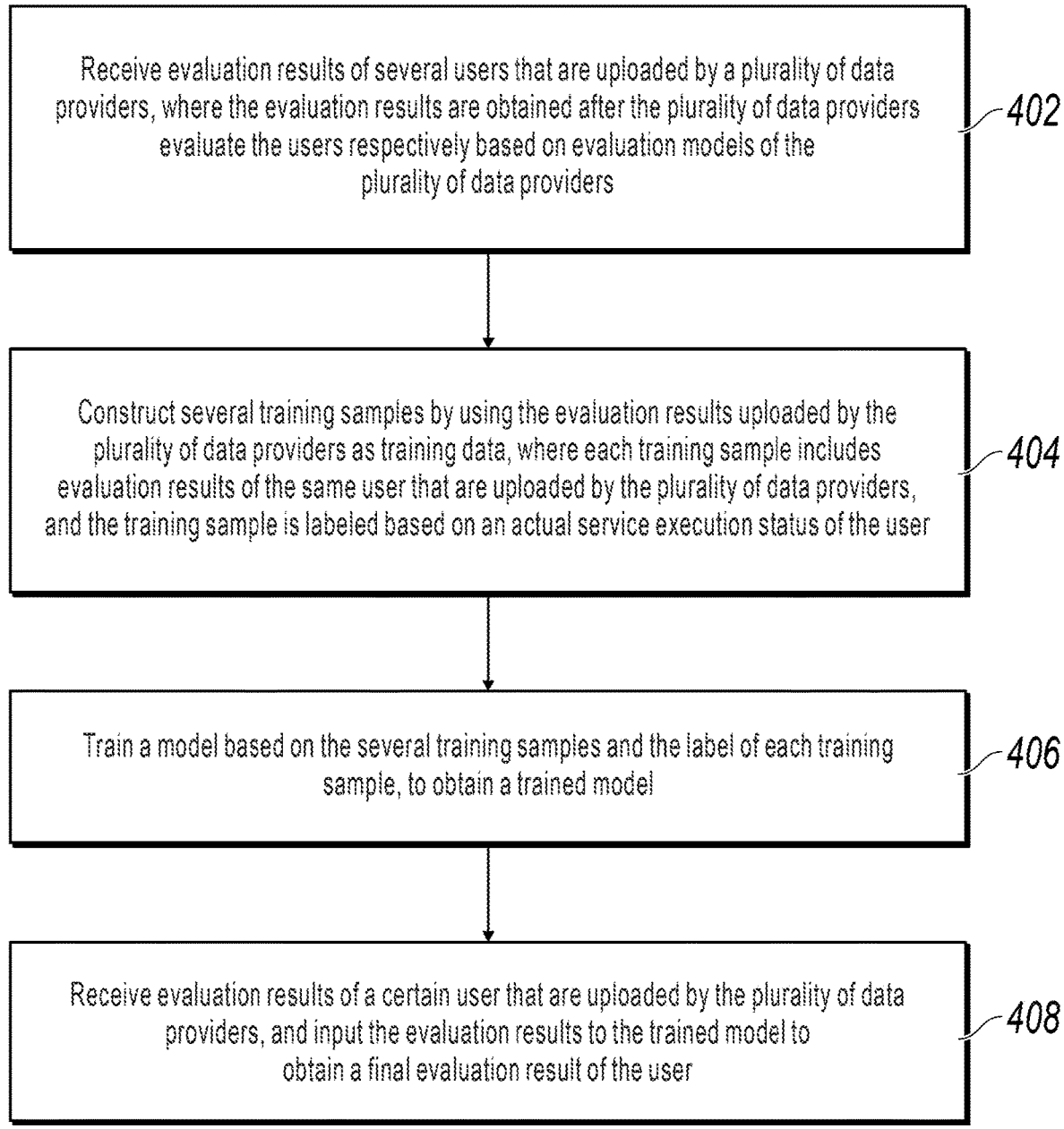
FIG. 4 is a flowchart illustrating a data prediction method, according to an implementation of the present specification.

Referring to FIG. 4, corresponding to the method implementation, the present specification further provides a data prediction method. The method is applied to a server of a risk evaluator, and the server performs the following steps:

Step 402: Receive evaluation results of several users that are uploaded by a plurality of data providers, where the evaluation results are obtained after the plurality of data providers evaluate the users respectively based on evaluation model of the plurality of data providers.

Step 404: Construct several training samples by using the evaluation results uploaded by the plurality of data providers as training data, where each training sample includes evaluation results of the same user that are uploaded by the plurality of data providers, and the training sample is labeled based on an actual service execution status of the user.

Step 406: Train a model based on the several training samples and the label of each training sample, to obtain a trained model.

Step 408: Receive evaluation results of a certain user that are uploaded by the plurality of data providers, and input the evaluation results to the trained model to obtain a final evaluation result of the user.

Implementation details of the steps are omitted in the present implementation, and a person skilled in the art can make references to the record in the previous implementation. Corresponding to the method implementation, the present specification further provides an implementation of a virtual resource allocation apparatus.

Figure 5:
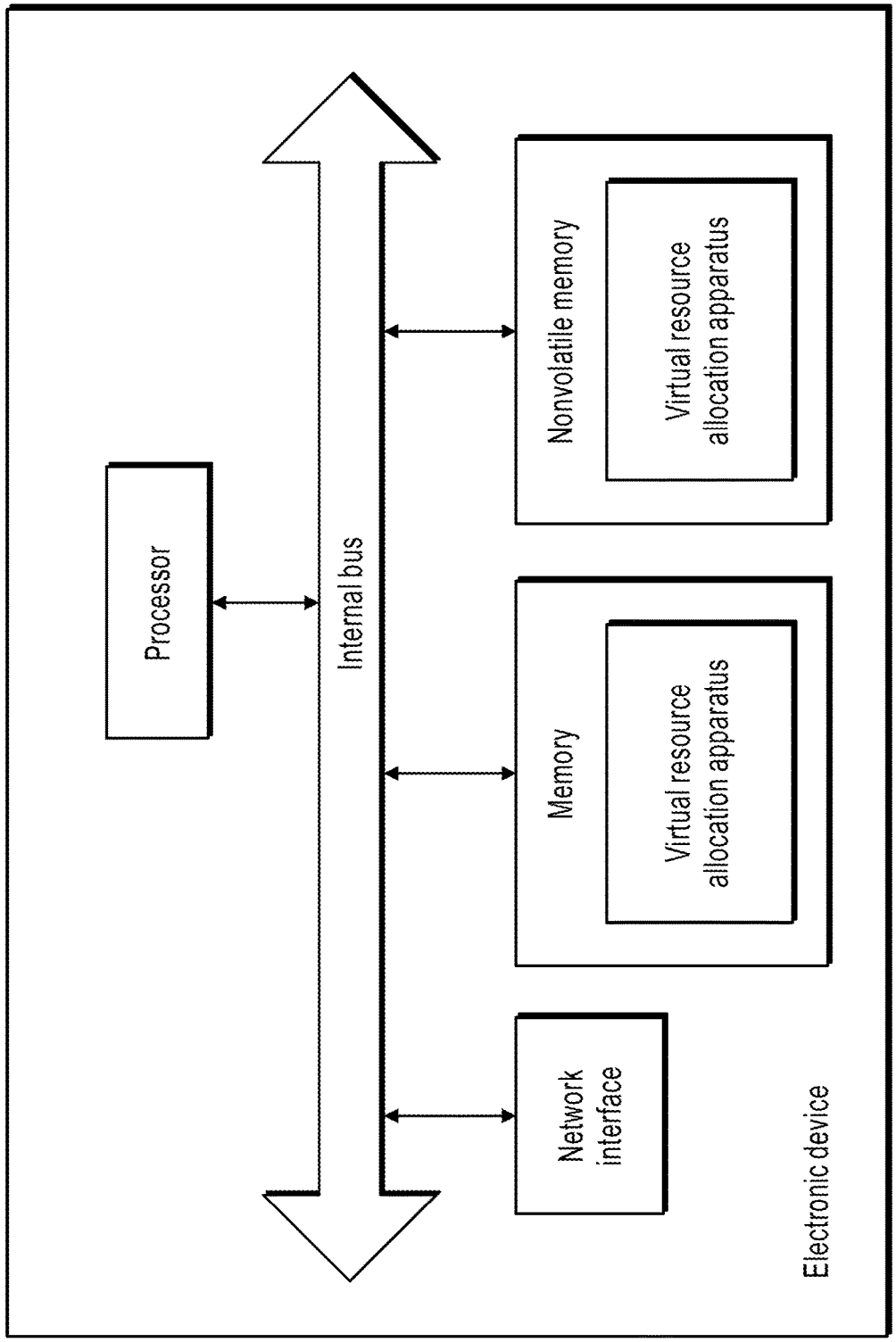
FIG. 5 is a structural diagram of hardware related to an electronic device that includes a virtual resource allocation apparatus, according to an implementation of the present specification.

The implementation of the virtual resource allocation apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a nonvolatile memory and running the instruction in a memory by a processor of an electronic device where the apparatus is located. In terms of hardware, FIG. 5 is a structural diagram of hardware of an electronic device where a virtual resource allocation apparatus is located, according to an implementation of the present specification. In addition to a processor, a memory, a network interface, and a nonvolatile memory shown in FIG. 5, the electronic device where the apparatus is located in some implementations can usually include other hardware based on an actual function of the electronic device. Details are omitted.

Figure 6:
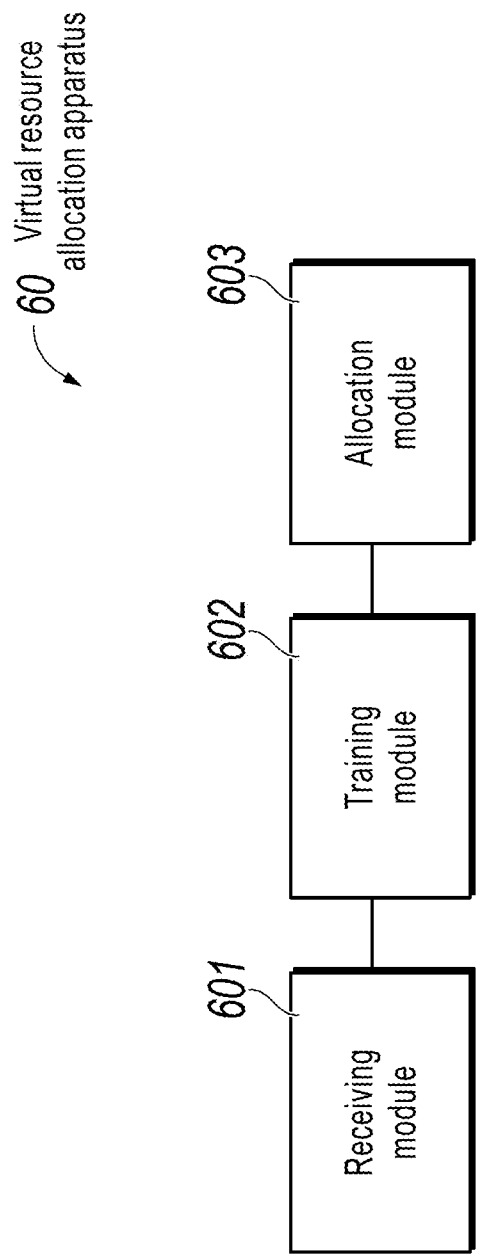
FIG. 6 is a logical block diagram illustrating a virtual resource allocation apparatus, according to an implementation of the present specification.

FIG. 6 is a block diagram illustrating a virtual resource allocation apparatus, according to an example implementation of the present specification.

Referring to FIG. 6, the virtual resource allocation apparatus 60 can be applied to the electronic device shown in FIG. 5, and includes a receiving module 601, a training module 602, and an allocation module 603.

The receiving module 601 is configured to receive evaluation results of several users that are uploaded by a plurality of data providers, where the evaluation results are obtained after the plurality of data providers evaluate the users respectively based on evaluation model of the plurality of data providers.

The training module 602 is configured to construct several training samples by using the evaluation results uploaded by the plurality of data providers as training data, where each training sample includes evaluation results of the same user that are uploaded by the plurality of data providers, and the training sample is labeled based on an actual service execution status of the user.

The allocation module 603 is configured to train a model based on the several training samples and the label of each training sample, use a coefficient of each variable in the trained models as the contribution level of each data provider, and allocate virtual resources to each data provider based on the contribution level of each data provider.

In the present implementation, the trained model is a linear model.

In the present implementation, the number of virtual resources allocated to each data provider is directly proportional to the contribution level of each data provider.

In the present implementation, the apparatus further includes: an evaluation module 604 (not shown in FIG. 6), configured to receive evaluation results of a certain user that are uploaded by the plurality of data providers, and input the evaluation results to the trained model to obtain a final evaluation result of the user.

In the present implementation, the virtual resource is a user data usage fund distributed to each data provider.

In the present implementation, the evaluation model is a user risk evaluation model, the evaluation result is risk score, and the label indicates whether the user is a risky user.

For details of an implementation process of functions and roles of each module in the apparatus, references can be made to the implementation process of the corresponding step in the previous method. Details are omitted here.

The apparatus implementation basically corresponds to the method implementation, and therefore for related parts, references can be made to related description in the method implementation. The previous apparatus implementation is merely an example. The units described as separate parts may or may not be physically separate, and parts displayed as units may or may not be physical units, may be located in one position, or may be distributed on a plurality of network units. Some or all of the modules can be selected based on an actual demand to achieve the objectives of the solutions of the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the method implementation, the present specification further provides an implementation of a virtual resource allocation system.

The virtual resource allocation system can include servers of a plurality of data providers and a server of a risk evaluator.

The servers of the plurality of data providers are configured to upload evaluation results of several users to the server of the risk evaluator, where the evaluation results are obtained after the plurality of data providers evaluate the users respectively based on evaluation model of the plurality of data providers.

The server of the risk evaluator is configured to construct several training samples by using the evaluation results uploaded by the plurality of data providers as training data, where each training sample includes evaluation results of the same user that are uploaded by the plurality of data providers, and the training sample is labeled based on an actual service execution status of the user; and train a model based on the several training samples and the label of each training sample, use a coefficient of each variable in the trained models as the contribution level of each data provider, and allocate virtual resources to each data provider based on the contribution level of each data provider.

Corresponding to the method implementation, the present specification further provides an implementation of an electronic device. The electronic device includes a processor and a memory configured to store machine executable instructions. The processor and the memory are usually connected to each other by using an internal bus. In another possible implementation, the device can further include an external interface, to communicate with another device or component.

In the present implementation, by reading and executing the machine executable instructions that are stored in the memory and that correspond to control logic of virtual resource allocation, the processor is prompted to perform the following operations: receiving evaluation results of several users that are uploaded by a plurality of data providers, where the evaluation results are obtained after the plurality of data providers evaluate the users respectively based on evaluation model of the plurality of data providers; constructing several training samples by using the evaluation results uploaded by the plurality of data providers as training data, where each training sample includes evaluation results of the same user that are uploaded by the plurality of data providers, and the training sample is labeled based on an actual service execution status of the user; and training a model based on the several training samples and the label of each training sample, using a coefficient of each variable in the trained models as the contribution level of each data provider, and allocating virtual resources to each data provider based on the contribution level of each data provider.

In the present implementation, the trained model is a linear model.

In the present implementation, the number of virtual resources allocated to each data provider is directly proportional to the contribution level of each data provider.

In the present implementation, by reading and executing the machine executable instructions that are stored in the memory and that correspond to the control logic of the virtual resource allocation, the processor is prompted to perform the following operation: receiving evaluation results of a certain user that are uploaded by the plurality of data providers, and inputting the evaluation results to the trained model to obtain a final evaluation result of the user.

In the present implementation, the virtual resource is a user data usage fund distributed to each data provider.

In the present implementation, the evaluation model is a user risk evaluation model, the evaluation result is risk score, and the label indicates whether the user is a risky user.

A person skilled in the art can easily figure out another implementation solution of the present specification after thinking over the specification and practicing the present disclosure here. The present specification intends to cover any variations, uses, or adaptations of the present specification, and these variations, uses, or adaptations comply with the general principles of the present specification and include common knowledge or commonly used techniques that are not disclosed in the technical field of the present specification. The specification and the implementations are merely considered as examples, and the actual scope and the spirit of the present specification are pointed out by the following claims.

It should be understood that the present specification is not limited to the precise structures that have been described above and shown in the accompanying drawings, and various modifications and changes can be made without departing from the scope of the present specification. The scope of the present specification is limited only by the appended claims.

Specific implementations of the present specification are described above. Other implementations fall within the scope of the appended claims. In some situations, the actions or steps described in the claims can be performed in an order different from the order in some implementations and the desired results can still be achieved. In addition, the process depicted in the accompanying drawings does not necessarily require a particular execution order to achieve the desired results. In some implementations, multi-tasking and parallel processing can be advantageous.

The previous descriptions are merely examples of implementations of the present application, but are not intended to limit the present application. Any modification, equivalent replacement, or improvement made without departing from the spirit and principle of the present application should fall within the protection scope of the present application.

What is claimed is:

1. A computer-implemented method, comprising:
    receiving, from a plurality of data providers, a plurality of user evaluation results of a plurality of users, generated by a plurality of user evaluation models, respectively, wherein each user evaluation model is trained on a corresponding training sample set by
        generating, for a corresponding user data sample, a respective data feature vector comprising data feature values, wherein the data feature values correspond to data features of a plurality of dimensions that are extracted from the user data sample, and
        constructing a target matrix based on the data feature vectors generated for the user data sample;
    constructing a plurality of risk evaluation model training samples from the user evaluation results, wherein each risk evaluation model training sample of the plurality of risk evaluation model training samples comprises a respective subset of the user evaluation results corresponding to a first user of the plurality of users;
    generating a label for each risk evaluation model training sample of the plurality of risk evaluation model training samples based on an actual service execution status of the first user to provide a plurality of labels;
    training a risk evaluation model based on the plurality of risk evaluation model training samples and the plurality of labels, wherein training the risk evaluation model comprises setting a plurality of variable coefficients, each variable coefficient specifying a contribution level of a corresponding data provider of the plurality of data providers; and
    allocating virtual resources to the plurality of data providers based on the plurality of variable coefficients.

2. The computer-implemented method of claim 1, wherein the trained risk evaluation model is a linear model.

3. The computer-implemented method of claim 1, further comprising:
    receiving user evaluation results of a particular user that are uploaded by the plurality of data providers, and inputting the user evaluation results of the particular user to the trained risk evaluation model to obtain a final user evaluation result of the particular user.

4. The computer-implemented method of claim 1, wherein a number of the virtual resources allocated to the plurality of data providers is directly proportional to the plurality of variable coefficients.

5. The computer-implemented method of claim 4, wherein the virtual resources comprise a user data usage fund distributed to the plurality of data providers.

6. The computer-implemented method of claim 1, wherein the plurality of user evaluation results comprise risk scores, and the label indicates whether the respective user is a risky user.

7. The computer-implemented method of claim 1, wherein the trained user evaluation model comprises a machine learning model.

8. The computer-implemented method of claim 7, wherein the machine learning model comprises a logistic regression model.

9. A non-transitory, computer-readable medium storing one or more instructions executable by a computer system to perform operations comprising:
    receiving, from a plurality of data providers, a plurality of user evaluation results of a plurality of users, generated by a plurality of user evaluation models, respectively, wherein each user evaluation model is trained on a corresponding training sample set by
        generating, for a corresponding user data sample, a respective data feature vector comprising data feature values, wherein the data feature values correspond to data features of a plurality of dimensions that are extracted from the user data sample, and constructing a target matrix based on the data feature vectors generated for the user data sample;

constructing a plurality of risk evaluation model training samples from the user evaluation results, wherein each risk evaluation model training sample of the plurality of risk evaluation model training samples comprises a respective subset of the user evaluation results corresponding to a first user of the plurality of users;

generating a label for each risk evaluation model training sample of the plurality of risk evaluation model training samples based on an actual service execution status of the first user to provide a plurality of labels;

training a risk evaluation model based on the plurality of risk evaluation model training samples and the plurality of labels, wherein training the risk evaluation model comprises setting a plurality of variable coefficients, each variable coefficient specifying a contribution level of a corresponding data provider of the plurality of data providers; and allocating virtual resources to the plurality of data providers based on the plurality of variable coefficients.

10. The non-transitory, computer-readable medium of claim 9, wherein the trained risk evaluation model is a linear model.

11. The non-transitory, computer-readable medium of claim 9, wherein the operations further comprise:

receiving user evaluation results of a particular user that are uploaded by the plurality of data providers, and inputting the user evaluation results of the particular user to the trained risk evaluation model to obtain a final user evaluation result of the particular user.

12. The non-transitory, computer-readable medium of claim 9, wherein a number of the virtual resources allocated to the plurality of data providers is directly proportional to the plurality of variable coefficients.

13. The non-transitory, computer-readable medium of claim 12, wherein the virtual resources comprise a user data usage fund distributed to the plurality of data providers.

14. The non-transitory, computer-readable medium of claim 9, wherein the plurality of user evaluation results comprise risk scores, and the label indicates whether the respective user is a risky user.

15. The non-transitory, computer-readable medium of claim 9, wherein the trained user evaluation model comprises a machine learning model.

16. The non-transitory, computer-readable medium of claim 15, wherein the machine learning model comprises a logistic regression model.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

receiving, from a plurality of data providers, a plurality of user evaluation results of a plurality of users, generated by a plurality of user evaluation models, respectively, wherein each user evaluation model is trained on a corresponding training sample set by generating, for a corresponding user data sample, a respective data feature vector comprising data feature values, wherein the data feature values correspond to data features of a plurality of dimensions that are extracted from the user data sample, and constructing a target matrix based on the data feature vectors generated for the user data sample;

constructing a plurality of risk evaluation model training samples from the user evaluation results, wherein each risk evaluation model training sample of the plurality of risk evaluation model training samples comprises a respective subset of the user evaluation results corresponding to a first user of the plurality of users;

generating a label for each risk evaluation model training sample of the plurality of risk evaluation model training samples based on an actual service execution status of the first user to provide a plurality of labels;

training a risk evaluation model based on the plurality of risk evaluation model training samples and the plurality of labels, wherein training the risk evaluation model comprises setting a plurality of variable coefficients, each variable coefficient specifying a contribution level of a corresponding data provider of the plurality of data providers; and allocating virtual resources to the plurality of data providers based on the plurality of variable coefficients.

18. The computer-implemented system of claim 17, wherein the trained risk evaluation model is a linear model.

19. The computer-implemented system of claim 17, wherein the operations further comprise:

receiving user evaluation results of a particular user that are uploaded by the plurality of data providers, and inputting the user evaluation results of the particular user to the trained risk evaluation model to obtain a final user evaluation result of the particular user.

20. The computer-implemented system of claim 17, wherein a number of the virtual resources allocated to the plurality of data providers is directly proportional to the plurality of variable coefficients.

21. The computer-implemented system of claim 20, wherein the virtual resources comprise a user data usage fund distributed to the plurality of data providers.

22. The computer-implemented system of claim 17, wherein the plurality of user evaluation results comprise risk scores, and the label indicates whether the respective user is a risky user.

23. The computer-implemented system of claim 17, wherein the trained user evaluation model comprises a machine learning model.

24. The computer-implemented system of claim 23, wherein the machine learning model comprises a logistic regression model.

* * * * *